United States Patent
Denis

(10) Patent No.: US 8,400,712 B2
(45) Date of Patent: Mar. 19, 2013

(54) METHOD AND APPARATUS FOR PROVIDING A SPLIT FIELD OF VIEW IN AN OPTICAL SIGHT

(75) Inventor: Donald J. Denis, Barrie (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 615 days.

(21) Appl. No.: 12/627,114

(22) Filed: Nov. 30, 2009

(65) Prior Publication Data

US 2011/0128620 A1   Jun. 2, 2011

(51) Int. Cl.
*G02B 23/00* (2006.01)
(52) U.S. Cl. ........................... 359/420; 359/630
(58) Field of Classification Search .................. 359/419, 359/420, 428, 629, 630
See application file for complete search history.

(56) References Cited

U.S. PATENT DOCUMENTS

| | | | |
|---|---|---|---|
| 2,527,719 A | 10/1950 | Greenstein et al. | |
| 3,128,623 A * | 4/1964 | Gold | 73/178 R |
| 3,572,886 A | 3/1971 | Curtiss et al. | |
| 4,439,755 A * | 3/1984 | LaRussa | 340/980 |
| 7,113,331 B2 * | 9/2006 | Hirunuma et al. | 359/427 |
| 2006/0010760 A1 * | 1/2006 | Perkins et al. | 42/142 |

* cited by examiner

*Primary Examiner* — Frank Font
(74) *Attorney, Agent, or Firm* — Lando & Anastasi, LLP

(57) ABSTRACT

A method and apparatus involve: admitting through objective optics of an optical sight a beam of radiation representing a scene; generating two different images of the scene; supplying the images to respective portions of a field of view at a viewing section; and superimposing a respective reticle onto each image. According to a different aspect a method and apparatus involve: causing two beams of radiation within an optical sight that represent different images of a scene to approach a reflective section in different directions, the reflective section causing a portion of each beam to reach a respective portion of a field of view at a viewing section; and superimposing a respective reticle onto each beam portion.

19 Claims, 5 Drawing Sheets

METHOD AND APPARATUS FOR PROVIDING A SPLIT FIELD OF VIEW IN AN OPTICAL SIGHT

FIELD OF THE INVENTION

This invention relates in general to optical sights and, more particularly, to optical sights that provide a split field of view.

BACKGROUND

Optical sights or scopes are used for a variety of purposes, one of which is to help a person accurately aim a firearm such as a rifle or a target pistol. The optical sight is typically mounted on the barrel of the firearm, and the person uses the sight to view the intended target in association with a reticle, often with a degree of magnification. Some sights have a tumbler that can be moved between two different positions in order to change the degree of magnification. That is, when the tumbler is in one position, the user sees the intended target with one degree of magnification, and when the tumbler is in the other position, the person sees the same target with a different degree of magnification.

Still another approach is to omit the tumbler and provide a split field of view, where the person simultaneously sees the same target with different degrees of magnification. Although pre-existing optical sights with split fields have been generally adequate for their intended purposes, they have not been satisfactory in all respects.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
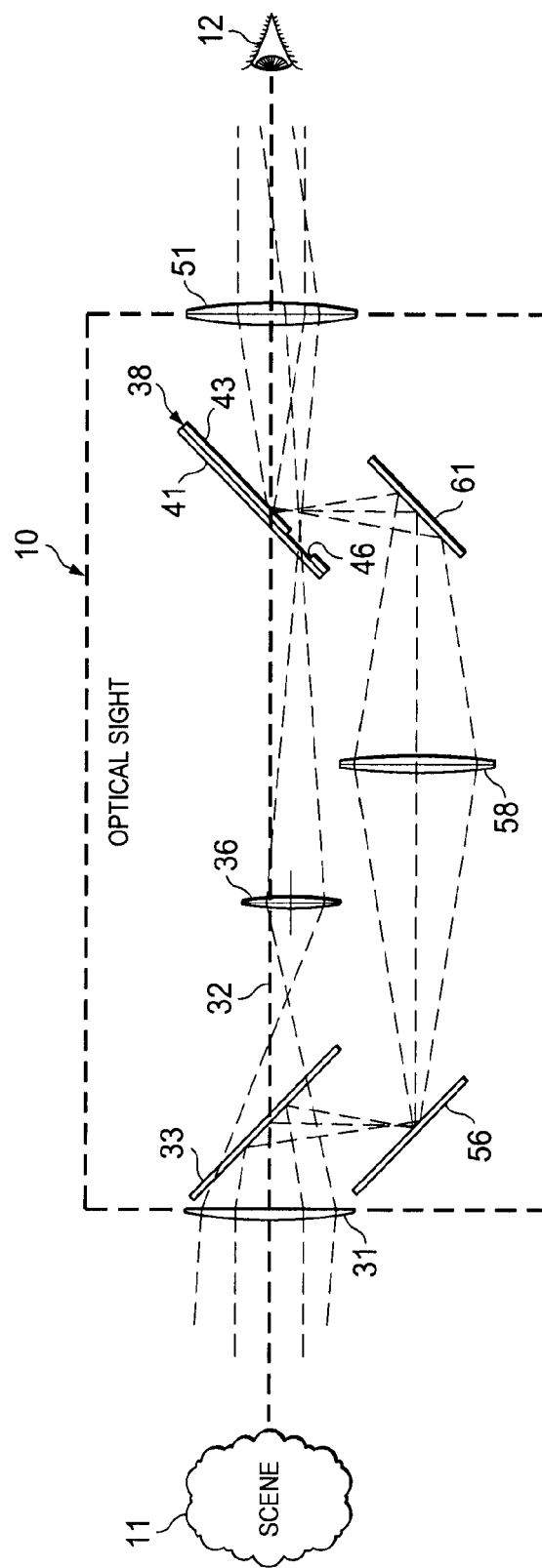
FIG. 1 is a diagrammatic view showing an apparatus that is an optical sight that embodies aspects of the invention, and through which a remote scene can be viewed by the eye of a user.

FIG. 1 is a diagrammatic view showing an apparatus that is an optical sight 10 that embodies aspects of the invention, and through which a remote scene 11 can be viewed by the eye 12 of a user. In the disclosed embodiment, the sight 10 can be removably mounted on a not-illustrated weapon such as a rifle or target pistol, but the invention is not limited to a weapon sight.

Figure 2:
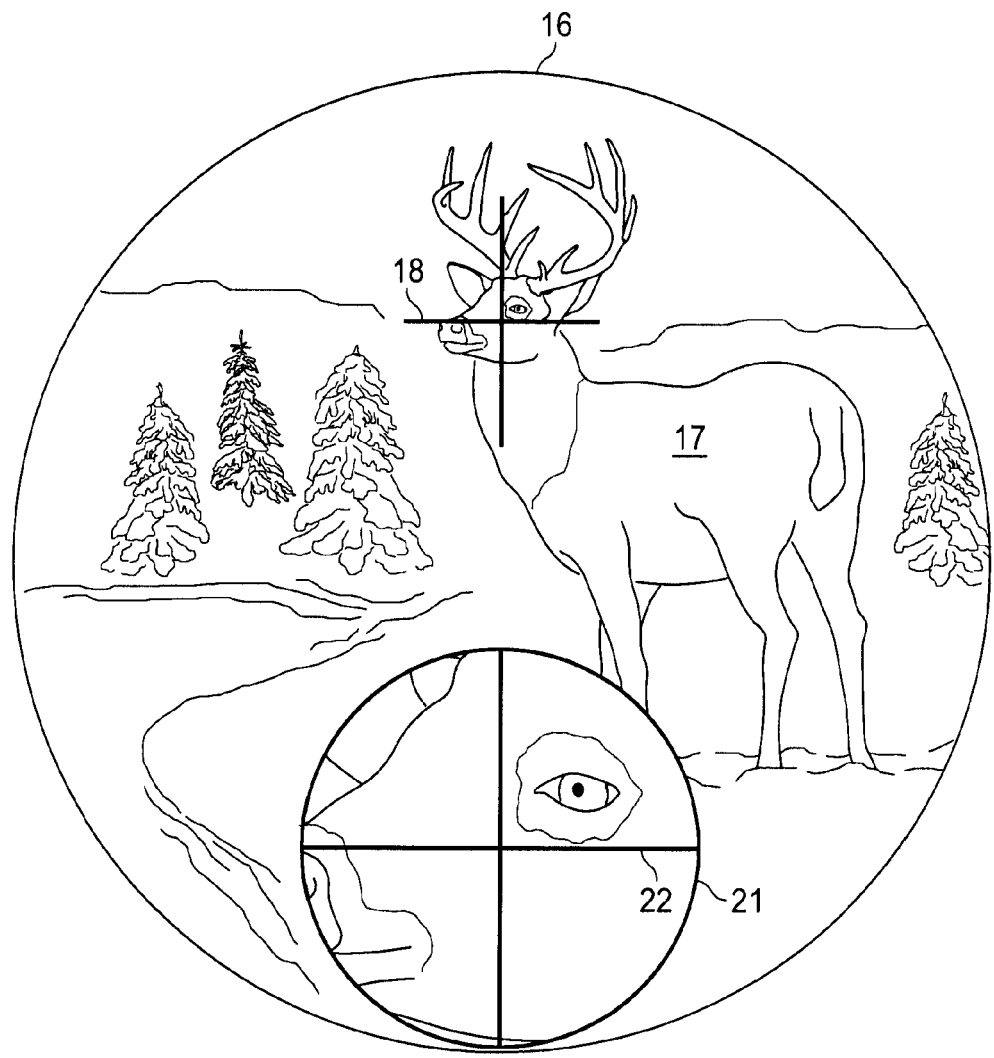
FIG. 2 is a diagrammatic view showing an example of a split field of view that a person would see when using the sight of FIG. 1.

FIG. 2 is a diagrammatic view showing an example of a split field of view (FOV) that the eye 12 of a user (FIG. 1) would see when using the sight 10. In more detail, a circular FOV 16 shows an image of part of the scene 11 (FIG. 1), including a target 17. The sight 10 superimposes a reticle 18 on this image of the scene. In the disclosed embodiment, the reticle 18 is a crosshairs-type reticle, but it could alternatively have any other suitable configuration. For the sake of discussion, it is assumed that the person using the sight has centered the reticle 18 on the head of the target 17, as shown in FIG. 2. In the disclosed embodiment, this FOV is provided with a magnification of 1x, but it would alternatively be possible to use some other magnification.

A second circular FOV 21 is inserted in the lower portion of the larger FOV 16. This smaller FOV 21 provides a magnified view of a portion of the image in the larger FOV 16 that is in the region around the center of reticle 18. The sight 10 superimposes a reticle 22 on this magnified image in FOV 21. In the disclosed embodiment, the reticle 22 is a crosshairs-type reticle, but it could alternatively have any other suitable configuration. The reticle 22 in the FOV 21 is centered on the same portion of the target 17 as the reticle 18 in the FOV 16. In the disclosed embodiment, the smaller FOV 21 provides a magnification of 4x in relation to the FOV 16, but it would alternatively be possible to use some other suitable magnification.

Referring again to FIG. 1, the optical sight 10 includes an objective lens 31 through which a beam of radiation from the scene 11 enters the optical sight. Although the sight 10 of FIG. 1 has a single objective lens 31, this could alternatively be a doublet, or some other suitable multi-lens configuration. The sight 10 also includes a beam splitter 33, but this could alternatively be some other suitable optical component, such as a splitting mirror. In the disclosed embodiment, the beam splitter 33 is oriented an angle of approximately 45° to the optical axis 32 of a beam of radiation that enters through the lens 31 and then travels to the beam splitter 33. At the beam splitter 33, a portion of this beam passes through the beam splitter and continues to travel rightwardly in FIG. 1, while another portion of the beam is reflected by the beam splitter and then travels downwardly. The portion of the beam that passes through the beam splitter 33 travels to and passes through a magnification control lens 36. The lens 36 is positioned so that it is slightly eccentric to the optical axis 32. Although the sight 10 of FIG. 1 uses a single lens at 36, this could alternatively be a doublet, or some other suitable multi-lens configuration.

The optical sight 10 includes a combining element 38 that is oriented at an angle of approximately 45° with respect to the optical axis 32, and with respect to the path of travel of radiation that has passed through the lens 36. The combining element 38 includes a glass plate 41 that is made from a material transmissive to visible radiation, and that has a reflective coating 43 of a known type provided on a side thereof remote from the lens 36. The reflective coating 43 has an opening 46 extending therethrough at a location offset from the optical axis 32. In the disclosed embodiment, the opening 46 has a shape that is approximately an oval, so that when this opening is viewed in a direction parallel to the optical axis 32, the opening 46 appears to be circular. Two thin perpendicular lines of an opaque material (not visible in FIG. 1) are formed on the same side of the glass plate 41 as the coating 43, and are centered within the opening 46. These two lines generate the reticle 22 (FIG. 2). Two additional thin perpendicular lines of the opaque material (not visible in FIG. 1) are provided on the reflective coating 43 at a location offset from the opening 46, and generate the reticle 18 (FIG. 2).

In the disclosed embodiment, an anti-reflective (AR) coating of a known type (not visible in FIG. 1) is provided on a side of the glass plate 41 opposite from the reflective coating 43. A further AR coating of a known type is provided on the same side of the glass plate 41 as the reflective coating 43, but only within the circular opening 46. As to radiation that passes through the objective lens 31, beam splitter 33, and magnifying lens 36, a portion of this radiation passes through the glass plate 41, impinges on the inner side of the reflective coating 43, is reflected, and then travels upwardly and is lost. The remainder of the radiation from the lens 36 passes through the glass plate 41, and then through the oval opening 46 in the plate 41. This radiation then passes through an ocular lens 51 of the sight 10 that serves as a viewing section, and continues on its way to the eye 12 of the user. The eye 12 sees this radiation as the magnified FOV 21 (FIG. 2). Although the sight 10 of FIG. 1 uses a single lens at 51, this could alternatively be a doublet, or some other suitable multi-lens configuration.

The sight 10 further includes a fold mirror 56, a magnification control lens 58, and a fold mirror 61. Although the sight 10 of FIG. 1 uses a single lens at 58, this could alternatively be a doublet, or some other suitable multi-lens configuration. The portion of the incoming radiation that is reflected by the beam splitter 33 travels downwardly to and is reflected by the fold mirror 56, travels rightwardly to and passes through the lens 58, and then travels to and is reflected by the fold mirror 61. This radiation then travels upwardly from the fold mirror 61 to the combining element 38. A portion of this radiation impinges on the combining element 38 in the region of the opening 46 through the coating 43. This portion of the radiation travels upwardly through the opening 46 and is effectively lost. The remainder of the radiation from the mirror 61 impinges on and is reflected by the reflective coating 43, and simultaneously has the reticle 18 superimposed thereon by the two opaque lines on the coating 43. This radiation, including the reticle 18, then travels rightwardly through the ocular lens 51 to the eye 12 of the user, where it appears as the larger FOV 16 (FIG. 2). The optics of the sight 10 are configured so that the lens 31, lens 58 and lens 51 collectively provide an effective magnification of 1×, and so that the lens 31, lens 36 and lens 51 collectively provide an effective magnification of 4×. The beam splitter 33 can be configured to have a splitting ratio that provides a desired relationship in the relative brightnesses of the 1× and 4× images.

The sight 10 of FIG. 1 has fixed-focus optics with no moving parts. The 1× path (through lens 58) is configured to be focused at approximately 30-50 yards, and the 4× path (through lens 36) is configured to be focused at approximately 120 yards. However, one or both of the 1× and 4× paths could be configured to be focused at some other distance. As another alternative, the sight 10 could be provided with one or more lenses or other optical parts that are movably supported and that provide a zoom effect for both FOVs.

Figure 3:
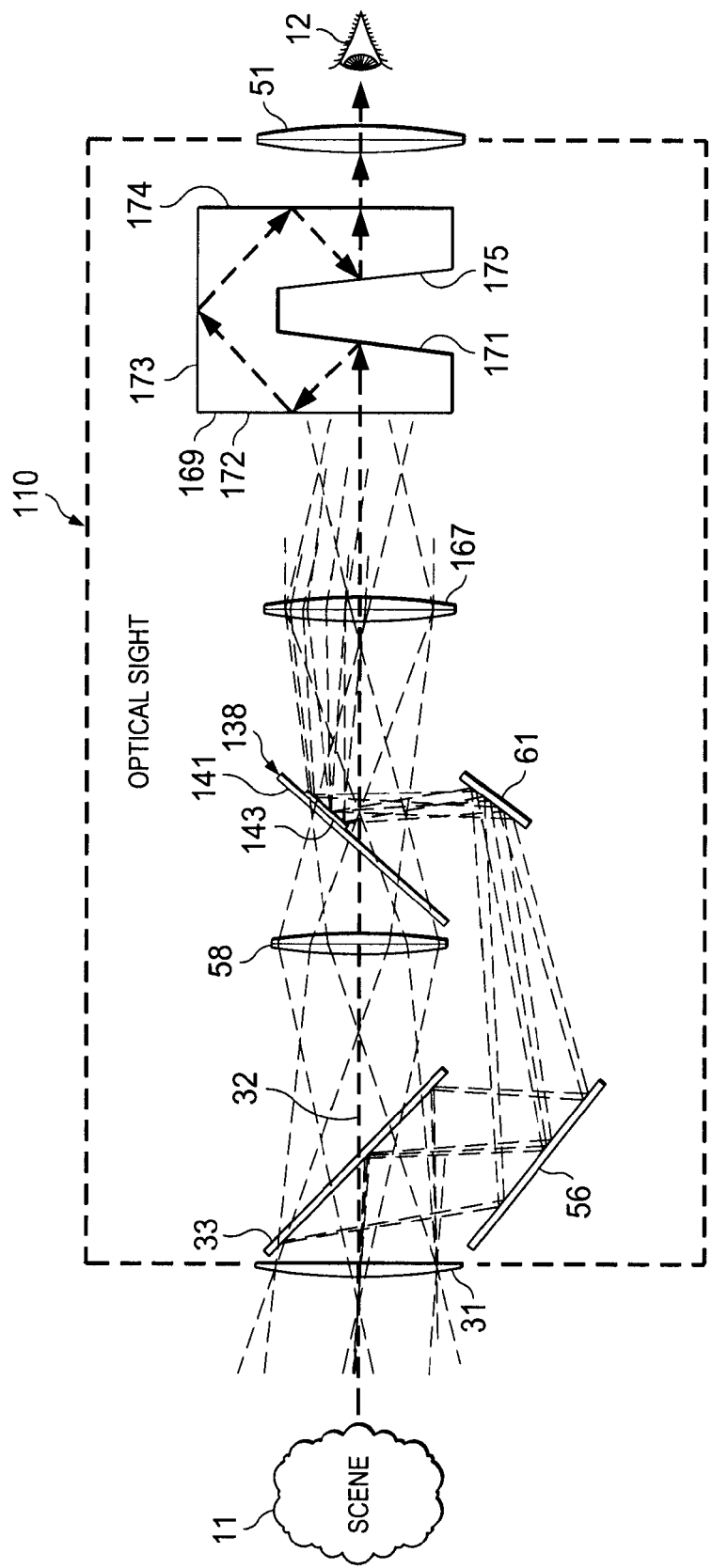
FIG. 3 is a diagrammatic view that is similar to FIG. 1, but shows an optical sight that is an alternative embodiment of the optical sight of FIG. 1.

FIG. 3 is a diagrammatic view that is similar to FIG. 1, but shows an optical sight 110 that is an alternative embodiment of the optical sight 10 of FIG. 1. The sight 110 of FIG. 3 generates effectively the same split FOV (FIG. 2) as the sight 10 of FIG. 1. Components in FIG. 3 that are identical to or equivalent to components in FIG. 1 are identified with the same reference numerals in both figures, and are not discussed again in detail. The following discussion focuses on the differences between FIGS. 1 and 3.

The combining element 38 of FIG. 1 is replaced in FIG. 3 with a combining element 138. The combining element 138 includes a glass plate 141 that is made of a material transmissive to visible radiation, and that has on a side opposite from the beam splitter 33 a small reflective coating 143 with approximately an oval shape. When the oval-shaped reflective coating 143 is viewed in a direction parallel to the optical axis 32, it appears to be circular. Although not visible in FIG. 3, two perpendicular lines of opaque material are provided on the coating 143, and intersect at the center of the coating 143. These two lines generate the reticle 22 of FIG. 2. Also, two further perpendicular lines of opaque material are provided on the side of the glass plate 141 opposite from the beam splitter 33, at a location offset downwardly from the coating 143. These two lines generate the reticle 18 of FIG. 2. The glass plate 141 has an AR coating on each side thereof, except where the reflective coating 143 is provided.

The sight 110 includes, to the right of the combining element 138, a lens 167 and an erecting prism 169 of a known type. Although the sight 110 of FIG. 3 uses a single lens at 167, this could alternatively be a doublet, or some other suitable multi-lens configuration. The erecting prism 169 may actually be multiple separate prisms that are physically coupled to each other, but for simplicity and clarity, the prism 169 is treated here as a single component. The erecting prism 169 has five surfaces 171, 172, 173, 174 and 175 that each have thereon a reflective coating that is not separately illustrated. In FIG. 3, as discussed above, the opaque perpendicular lines that generate the two reticles 18 and 22 (FIG. 2) are provided on a surface of the glass plate 141. However, they could alternatively be provided at some other suitable location. By way of example and not limitation, the opaque lines could be provided on either the surface 171 or the surface 175 of the erecting prism 169, between the prism surface and the reflective coating thereon.

A beam of radiation from the scene 11 enters the optical sight 110 through the objective lens 31. This beam of radiation travels to the beam splitter 33, where one portion passes through the beam splitter, and another portion is reflected by the beam splitter and travels downwardly. The radiation that passes through the beam splitter 33 travels to and passes through the lens 58, and then travels to the combining element 138. A portion of this radiation will pass through the glass plate 141, will impinge on the rear side of the oval reflective coating 143, will be reflected and travel upwardly, and will effectively be lost. The remainder of the radiation from the lens 58 will pass through the glass plate 141, and the reticle 18 (FIG. 2) will be superimposed on this radiation. This radiation will then continue traveling rightwardly in a generally horizontal direction in FIG. 3, and will pass through the lens 167 and then enter the erecting prism 169. This radiation will be successively reflected at each of the five surfaces 171-175 in the erecting prism 169, and will then exit the erecting prism and travel through the ocular lens 51 to the eye 12 of the user. This radiation serves as the larger 1× FOV 16 in FIG. 2.

The radiation reflected by the beam splitter 33 travels vertically downwardly in FIG. 3 to the fold mirror 56, where it is reflected and then travels approximately horizontally to the fold mirror 61. At the fold mirror 61, this radiation is reflected again and travels vertically upwardly in FIG. 3 to the combining element 138. A portion of this radiation will impinge on the combining element 138 at locations spaced from the reflecting surface 143, will pass through the glass plate 141, will continue traveling upwardly, and will effectively be lost. In contrast, the portion of this radiation that impinges on the oval reflective coating 143 will be reflected and simultaneously have the reticle 22 (FIG. 2) superimposed thereon. This radiation will then travel rightwardly in FIG. 3 through the lens 167, through the erecting prism 169, and through the ocular lens 51 to the eye 12 of the user. This radiation serves as the smaller 4× FOV 21 in FIG. 2.

Figure 4:
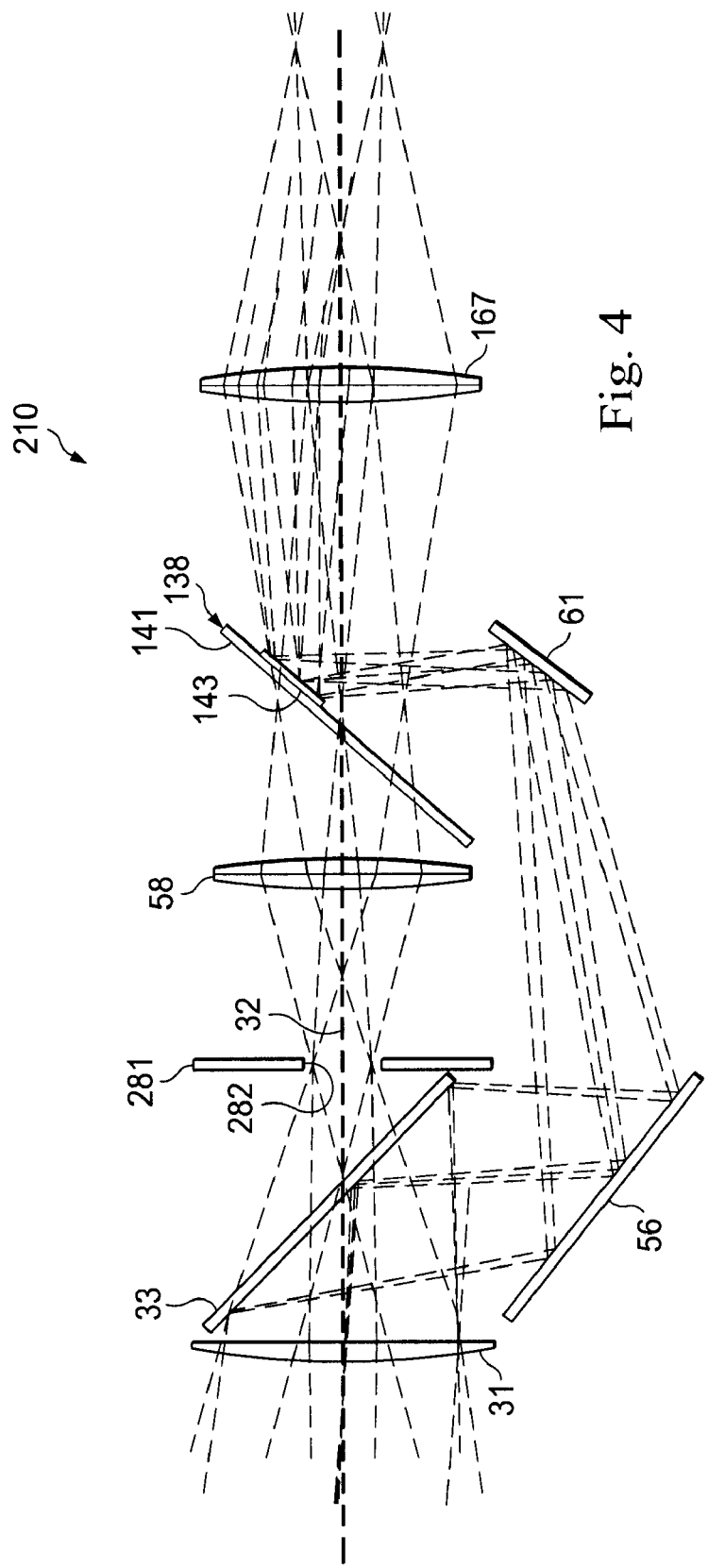
FIG. 4 is a diagrammatic view showing a portion of an optical sight that is an alternative embodiment of a corresponding portion of the optical sight of FIG. 3.

FIG. 4 is a diagrammatic view showing a portion 210 of an optical sight, this portion being an alternative embodiment of a corresponding portion of the optical sight 110 of FIG. 3. The basic difference is that, in the sight of FIG. 4, an aperture stop 281 with a circular opening 282 therethrough has been added between the beam splitter 33 and the lens 58. The aperture stop 281 allows the eye 12 of a user (FIG. 3) to be spaced a short distance from the optical sight, but still see the full image of the larger FOV 16 (FIG. 2). The operation of the embodiment of FIG. 4 is generally similar to that of the embodiment of FIG. 3, and is therefore not described again here in detail.

Figure 5:
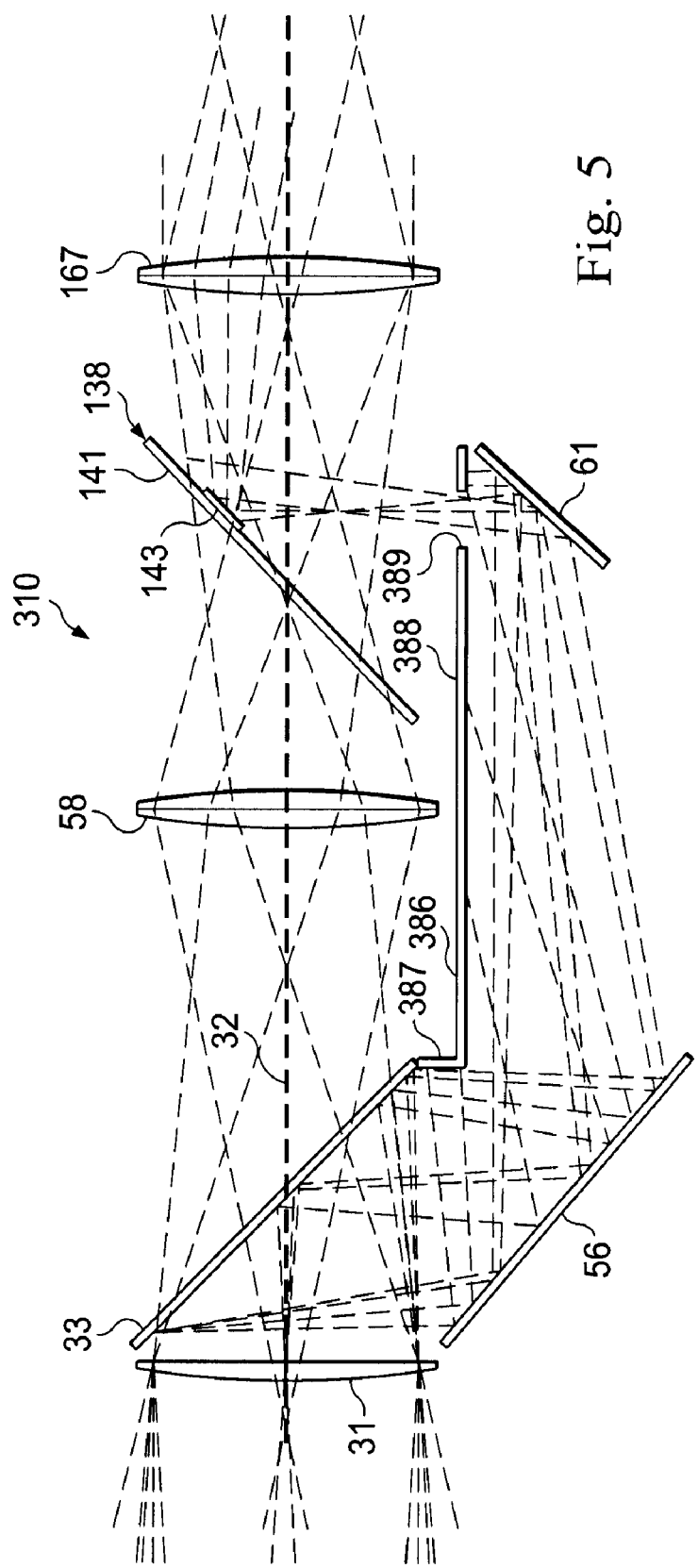
FIG. 5 is a diagrammatic view showing a portion of an optical sight that is a further alternative embodiment of a corresponding portion of the optical sight of FIG. 3.

FIG. 5 is a diagrammatic view showing a portion 310 of an optical sight that is a further alternative embodiment of a corresponding portion of the optical sight 110 of FIG. 3. Only the differences are discussed here. In particular, in FIG. 5, the positions of the fold mirrors 56 and 61 have been adjusted slightly in comparison to FIG. 3. An L-shaped baffle 386 has been added, and is made from a material that is opaque and absorptive to visible radiation. The baffle 386 has a vertical leg 387 with its upper end adjacent the lower end of the beam splitter 33. The baffle 386 also has a horizontal leg 388 that extends from the lower end of leg 387 to a location above the fold mirror 61. The leg 388 has a circular opening 389 extending therethrough near an outer end thereof, at a location above the fold mirror 61. The operation of the embodiment of FIG. 5 is generally similar to that of the embodiments of FIGS. 3 and 4, and is therefore not described again here in detail.

Although some selected embodiments have been illustrated and described in detail, it should be understood that a variety of substitutions and alterations are possible without departing from the spirit and scope of the present invention, as defined by the claims that follow.

What is claimed is:

1. An apparatus comprising an optical sight that includes:
a viewing section;
objective optics, wherein a beam of radiation representing a scene external to said sight enters said sight through said objective optics;
image-generating optics that generate from said beam a first image of said scene that is supplied to a first portion of a field of view at said viewing section, and that generate from said beam a second image of said scene that differs from said first image and that is supplied to a second portion of said field of view mutually exclusive from said first portion thereof, wherein said image-generating optics include:
 a splitting section that is disposed in the path of said beam and that splits said beam into first and second sub-beams;
 a combining section that combines said first and second sub-beams in a manner so that radiation from said first sub-beam appears as said first image in said first portion of said field of view at said viewing section and radiation from said second sub-beam appears as said second image in said second portion of said field of view; and
 a processing section that modifies one of said first and second sub-beams in relation to the other thereof; and
reticle introducing structure that superimposes a first reticle on said first image, and superimposes a second reticle on said second image.

2. An apparatus according to claim 1, wherein said image-generating optics magnifies one of said first and second images in relation to the other thereof.

3. An apparatus according to claim 1, wherein said processing section magnifies one of said first and second sub-beams in relation to the other thereof.

4. An apparatus according to claim 1, wherein said image-generating optics include first and second reflective sections, one of said first and second sub-beams being successively reflected by said first and second reflective sections while traveling from said splitting section to said combining section.

5. An apparatus according to claim 1, wherein said combining section includes a reflective section positioned so that:
said first sub-beam approaches said reflective section in a first direction, a first portion of said first sub-beam impinges on said reflective section and is blocked by said reflective section from traveling past said reflective section in said first direction, and a second portion of said first sub-beam travels past said reflective section in said first direction without impinging on said reflective section and serves as said first image; and
said second sub-beam approaches said reflective section in a second direction oriented at an angle to said first direction, a first portion of said second sub-beam impinges on and is reflected by said reflective section so as to thereafter travel away from said reflective section in said first direction with said second portion of said first sub-beam and serve as said second image, and a second portion of said second sub-beam travels past said reflective section in said second direction without impinging thereon.

6. An apparatus according to claim 5, wherein said reflective section has a shape that defines a circular shape of a boundary between said first and second portions of said field of view.

7. A method of processing radiation in an optical sight, comprising:
admitting through objective optics a beam of radiation representing a scene external to said sight;
generating from said beam differing first and second images of said scene, wherein said generating includes:
 splitting said beam into first and second sub-beams;
 combining said first and second sub-beams in a manner so that radiation from said first sub-beam appears as said first image in said first portion of said field of view at said viewing section and radiation from said second sub-beam appears as said second image in said second portion of said field of view; and
 modifying one of said first and second sub-beams in relation to the other thereof;
supplying said first and second images respectively to mutually exclusive first and second portions of a field of view at a viewing section of said sight;
superimposing a first reticle on said first image; and
superimposing a second reticle on said second image.

8. A method according to claim 7, wherein said generating further includes magnifying one of said first and second images in relation to the other thereof.

9. A method according to claim 7, wherein said modifying includes magnifying one of said first and second sub-beams in relation to the other thereof.

10. A method according to claim 7, wherein said combining includes:
causing said first sub-beam to approach a reflective section in a first direction so that a first portion of said first sub-beam impinges on said reflective section and is blocked by said reflective section from traveling past said reflective section in said first direction, and so that a second portion of said first sub-beam travels past said reflective section in said first direction without impinging on said reflective section and serves as said first image; and
causing said second sub-beam to approach said reflective section in a second direction oriented at an angle to said first direction so that a first portion of said second sub-beam impinges on and is reflected by said reflective section to thereafter travel away from said reflective section in said first direction with said second portion of said first sub-beam and serve as said second image, and so that a second portion of said second sub-beam travels past said reflective section in said second direction without impinging thereon.

11. A method according to claim 10, including configuring said reflective section to have a shape that defines a circular shape of a boundary between said first and second portions of said field of view.

12. An apparatus comprising an optical sight that includes:
a viewing section;
a reflective section;
first optics that cause a first beam of radiation representing a first image of a scene external to said sight to travel along a first path of travel that approaches said reflective section in a first direction, said first beam having mutually exclusive first and second portions, said first portion of said first beam impinging on said reflective section and being blocked by said reflective section from traveling past said reflective section along said first path of travel in said first direction, and said second portion of said first beam traveling past said reflective section in said first direction without impinging thereon and continuing along said first path of travel to a first portion of a field of view at said viewing section; and
second optics that cause a second beam of radiation representing a second image of said scene to travel along a second path of travel that approaches said reflective section in a second direction oriented at an angle to said first direction, said second beam having mutually exclusive first and second portions, said first portion of said second beam impinging on and being reflected by said reflective section so as to thereafter travel in said first direction away from said reflective section and proceed along said first path of travel to a second portion of said field of view at said viewing section, said second portion of said second beam traveling past said reflective section in said second direction without impinging thereon and continuing along said second path of travel without reaching said viewing section; and
reticle introducing structure that superimposes a first reticle on said second portion of said first beam, and superimposes a second reticle on said first portion of said second beam.

13. An apparatus according to claim 12, wherein said first and second optics are configured so that one of said first and second images is magnified in relation to the other thereof.

14. An apparatus according to claim 12, wherein said reflective section has a shape that defines a circular shape of a boundary between said first and second portions of said field of view.

15. An apparatus according to claim 12, including: objective optics through which a third beam of radiation representing said scene enters said sight; and third optics that generate each of said first and second beams from said third beam.

16. A method of processing radiation in an optical sight, comprising:
causing a first beam of radiation representing a first image of a scene external to said sight to travel along a first path of travel that approaches a reflective section in a first direction so that a first portion of said first beam impinges on said reflective section and is blocked by said reflective section from traveling past said reflective section along said first path of travel in said first direction, and so that a second portion of said first beam mutually exclusive of said first portion thereof travels past said reflective section in said first direction without impinging thereon and continues along said first path of travel to a first portion of a field of view at said viewing section; and
causing a second beam of radiation representing a second image of said scene to travel along a second path of travel that approaches said reflective section in a second direction oriented at an angle to said first direction so that a first portion of said second beam impinges on and is reflected by said reflective section to thereafter travel in said first direction away from said reflective section and proceed along said first path of travel to a second portion of said field of view at said viewing section, and so that a second portion of said second beam mutually exclusive of said first portion thereof travels past said reflective section in said second direction without impinging thereon and continues along said second path of travel without reaching said viewing section;
superimposing a first reticle on said second portion of said first beam; and
superimposing a second reticle on said first portion of said second beam.

17. A method according to claim 16, including magnifying one of said first and second images in relation to the other thereof.

18. A method according to claim 16, including configuring said reflective section to have a shape that defines a circular shape of a boundary between said first and second portions of said field of view.

19. A method according to claim 16, including:
admitting through objective optics a third beam of radiation representing a scene external to said sight; and
generating each of said first and second beams from said third beam.

* * * * *